Sept. 15, 1942.     R. WISTAR     2,295,818
DEVICE FOR RECORDING ANSWERS TO EXAMINATION QUESTIONS
Filed June 25, 1941
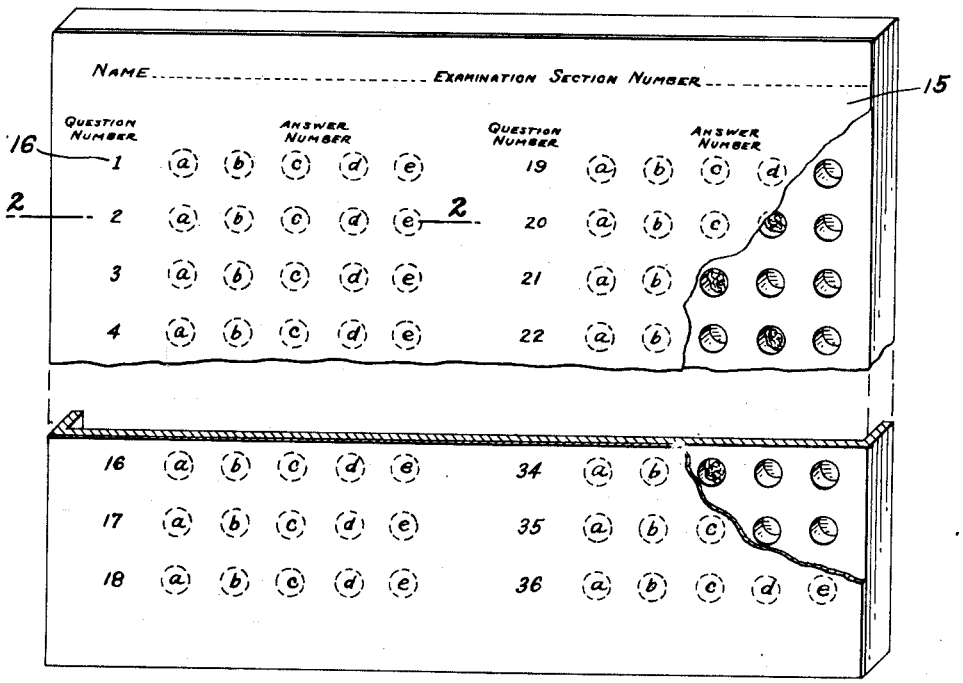
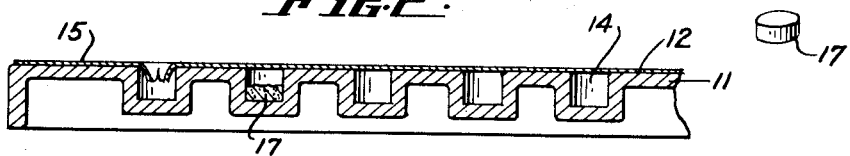
INVENTOR.
RICHARD WISTAR
BY
Oscar A. Mellin
ATTORNEY Patented Sept. 15, 1942

2,295,818

UNITED STATES PATENT OFFICE 2,295,818

DEVICE FOR RECORDING ANSWERS TO EXAMINATION QUESTIONS

Richard Wistar, Oakland, Calif.

Application June 25, 1941, Serial No. 399,755

2 Claims. (Cl. 35—48)

This invention relates to devices for use in recording answers to examination questions.

Examinations of the objective type in which a question is propounded together with a plurality of answers, from the latter of which the student must select the correct one, have not been found entirely satisfactory. One reason for this is that in the ordinary manner of giving such type of examination, the examinee selects but one answer, and if it be incorrect, there is nothing to apprise the examinee of that fact, and the incorrect answer is most likely to remain with the student as being correct.

It is the principal object of the present invention to provide a simple and inexpensive device for use in giving examinations of the objective type, which device will sensibly indicate to the examinee whether or not the answer selected is the correct one, thereby enabling ultimate selection of the correct answer and informing the student thereof for retention, while recording the number, if any, of incorrect answers previously selected for the information of the examiner.

The invention is exemplified in the following description and illustrated by way of example in the accompanying drawing, in which:

Fig. 1 is a perspective view of a device embodying one form of my invention.

Fig. 2 is a cross-sectional view therethrough taken on the line 2—2 of Fig. 1.

Fig. 3 is a perspective view of one of the plugs used in connection with the recording sheet holder.

Referring to the accompanying drawing and more particularly to Figs. 1 to 3, inclusive, wherein one form of my invention is disclosed, I have there illustrated a device for recording answers to examination questions. This device comprises what I prefer to term a recording sheet holder 11 which is rectangular in form having a flat plane working surface 12. I prefer that the work sheet holder be formed of light molded material, such as plastic, although other materials may be employed. The reason for forming it as I have stated is that it is very light and comparatively inexpensive to manufacture so that an examiner can readily distribute a considerable number of them to the examinees.

Formed in the work surface 12 of the work sheet holder 11 is a plurality of geometrically arranged sockets 14. In the present instance I have shown two sets of these sockets 14 arranged in rows of five, which are equally spaced apart, the rows being likewise equally spaced apart.

To be secured in any suitable manner over the working surface 12 of the work sheet holding device 11 is a work sheet 15 which may be of opaque paper. Arranged on this work sheet are the question numbers 16 and opposite each question number are subdivisions thereof, each indicating an answer to the question and preferably indicated by suitable indicia, as illustrated. The spacing of the answer indicating numbers or letters is the same as the spacing between the sockets of each row, and the spacing between each question number is the same as the spacing between the rows of the sockets, so that when the work sheet 15 is secured on the work sheet holder 11, the indicia indicating the answer numbers to the various questions will each register with a socket 14. The questions and answers themselves, of course, are written on a separate examination sheet, the answers to each question being indicated on the examination paper by the same indicia as the answer numbers are given on the work sheet 15.

Prior to securing the work sheet 15 over the holder, a cork or rubber plug 17 is inserted into the socket which will align with the indicator of the correct answer in the row of sockets aligned with each question number. The work sheet itself can, of course, be pierced by a punch or stylus, or by using a pencil as a stylus. The student then selects what he believes is the correct answer to the question and pierces through the work sheet 15. If the instrument he is using as a punch strikes bottom in the socket, he is sensibly informed that he has selected an incorrect answer. However, if he has selected the correct answer, the instrument which he has used as a punch or stylus encounters the cork or rubber plug 17 and he is sensibly informed that he has selected the correct answer.

Due to the fact that the work sheet will record each punching or piercing, the examiner will, of course, immediately, upon inspection of the sheet, know how many incorrect answers the student selected prior to selecting the correct answer. This information is, of course, important to an examiner.

It is an important feature of the device, of course, that the student be made sensibly aware of the correct answer because upon being apprised of this fact, he will not retain in his mind an incorrect answer to the question.

While I have shown the preferred forms of my invention, it is to be understood that various changes may be made in the construction by those skilled in the art without departing from the spirit of the invention as defined in the appended claims.

Having thus described my invention, what I claim and desire to secure by Letters Patent is:

1. A device of the character described comprising a work sheet holder, a penetratable opaque work sheet to be secured thereover, said work sheet having imprinted thereon indicia indicating a question and a plurality of answers thereto, and means carried by the work sheet holder in register with the indicia indicating the answers for sensibly indicating correct and incorrect answers when the work sheet is penetrated to record the selection of an answer, said means comprising sockets formed in the work sheet holder, one being in alignment with each indication of an answer, and a removable member to be received by a socket in register with the indication of the correct answer.

2. A device of the character described comprising a work sheet holder, a penetratable opaque sheet to be removably secured over one face thereof, said work sheet holder having a plurality of sockets formed therein, said sockets being open at the face of said holder over which said work sheet is to be secured and extending at right angles therefrom and being closed at their opposite ends, said sockets being of a uniform depth and diameter, said work sheet having imprinted thereon indicia indicating a question and a plurality of answers thereto, the indicia indicating the answers being in register with said sockets, and a removable member to be received by any one of said sockets in register with the indication of the correct answer so as to sensibly indicate the correct answer when the work sheet is penetrated to record the selection of an answer.

RICHARD WISTAR.